(12) United States Patent
Rimondi

(10) Patent No.: US 7,308,780 B2
(45) Date of Patent: Dec. 18, 2007

(54) APPARATUS FOR SEALING THE OVERLAPPING EDGES OF A TUBULAR FILM

(75) Inventor: Renato Rimondi, Bazzano (IT)

(73) Assignee: A.W.A.X. Progettazione E Ricerca S.r.l. (IT)

( * ) Notice: Subject to any disclaimer, the term of this patent is extended or adjusted under 35 U.S.C. 154(b) by 476 days.

(21) Appl. No.: 10/505,411

(22) PCT Filed: Jul. 3, 2003

(86) PCT No.: PCT/EP03/07120

§ 371 (c)(1),
(2), (4) Date: Aug. 24, 2004

(87) PCT Pub. No.: WO2004/009450

PCT Pub. Date: Jan. 29, 2004

(65) Prior Publication Data

US 2005/0178095 A1  Aug. 18, 2005

(30) Foreign Application Priority Data

Jul. 18, 2002 (IT) ............................... BO02A0463

(51) Int. Cl.
*B65B 51/10* (2006.01)
(52) U.S. Cl. .................. 53/373.8; 53/550; 53/375.9
(58) Field of Classification Search ............... 53/373.7, 53/373.8, 373.9, 375.8, 375.9, 550; 156/356, 156/359, 285, 497, 498, 499
See application file for complete search history.

(56) References Cited

U.S. PATENT DOCUMENTS

| | | | | |
|---|---|---|---|---|
| 3,925,963 A | * | 12/1975 | Greenawalt et al. | ......... 156/497 |
| 3,951,050 A | * | 4/1976 | Poole | .......................... 156/497 |
| 4,103,473 A | * | 8/1978 | Bast et al. | ................... 156/497 |
| 4,210,480 A | * | 7/1980 | Wilharm | ..................... 53/373.9 |
| 4,260,447 A | * | 4/1981 | Muscariello | ................. 156/497 |
| 4,555,296 A | * | 11/1985 | Burtch et al. | ............... 156/497 |
| 4,664,649 A | * | 5/1987 | Johnson et al. | ............. 156/497 |
| 4,737,213 A | * | 4/1988 | Paeglis et al. | .............. 156/497 |
| 4,976,811 A | * | 12/1990 | Siebert | ........................ 156/497 |
| 5,466,326 A | | 11/1995 | Cherney | |
| 6,129,809 A | * | 10/2000 | Ellenberger et al. | ......... 156/497 |
| 7,076,930 B2 | * | 7/2006 | Rimondi | ....................... 53/450 |
| 2001/0039997 A1 | * | 11/2001 | Zeuschner | ................... 156/497 |
| 2004/0026029 A1 | * | 2/2004 | Martin et al. | ................ 156/497 |

FOREIGN PATENT DOCUMENTS

| | | |
|---|---|---|
| CH | 361237 | 3/1962 |
| GB | 1 238 373 | 7/1971 |
| WO | WO-98/40202 | 9/1998 |
| WO | WO 03/051715 | 6/2003 |

* cited by examiner

*Primary Examiner*—Louis Huynh
(74) *Attorney, Agent, or Firm*—Stites & Harbison PLLC; Marvin Petry

(57) ABSTRACT

An apparatus for sealing longitudinal overlapping edges of tubular thermoplastic film. The apparatus comprises a fixed block (31) for guiding and holding the overlapping edges and a sealing head (6) spaced from the fixed block for directing jets of hot air onto the overlapping edges of the film guided on the fixed block. The sealing head (6) is movably mounted such that the sealing head is positioned a short distance from the film as the film is advancing and the sealing head is withdrawn from the film when the film is stop.

20 Claims, 4 Drawing Sheets

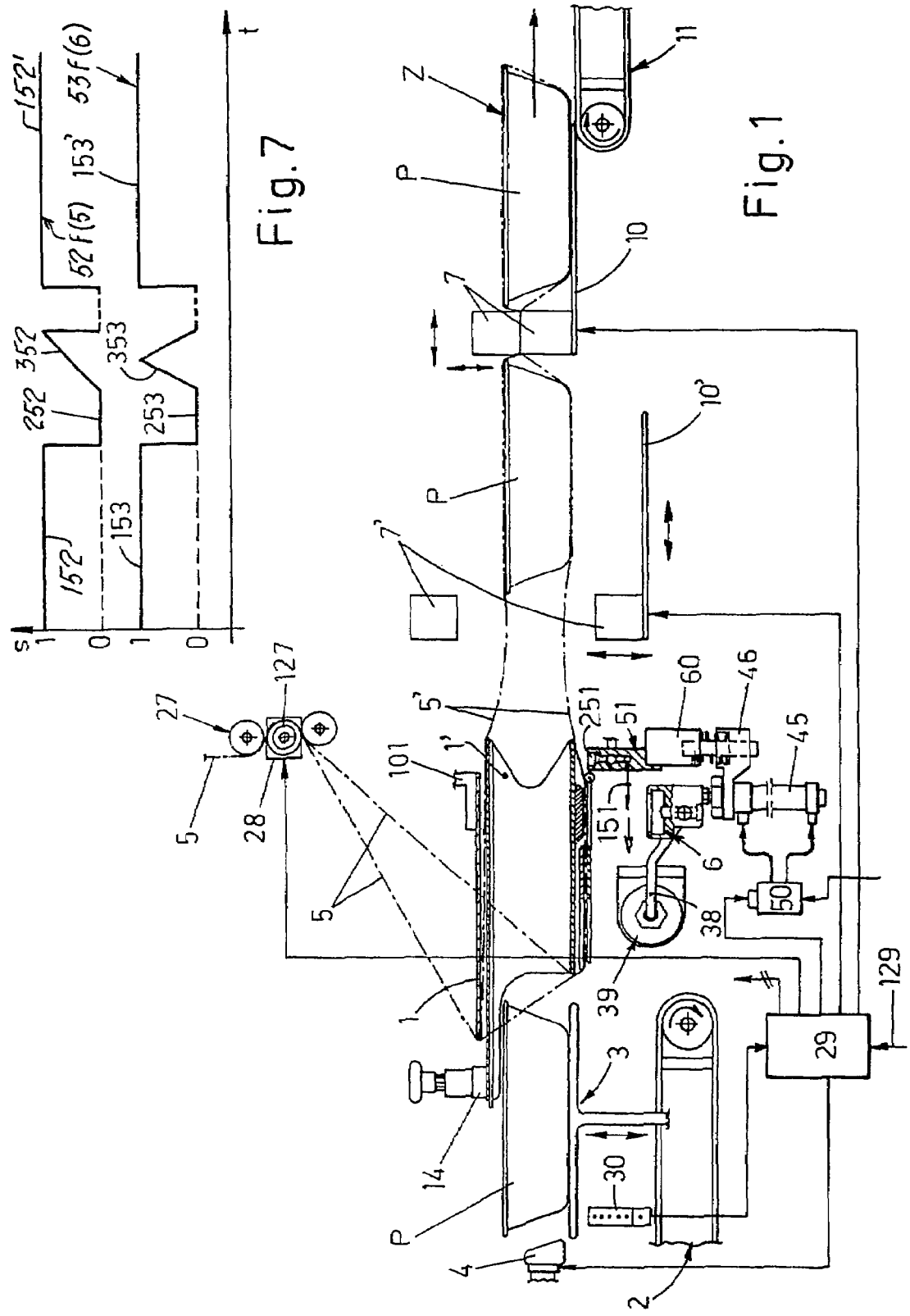

US 7,308,780 B2

APPARATUS FOR SEALING THE OVERLAPPING EDGES OF A TUBULAR FILM

This application is a U.S. national stage of International Application No. PCT/EP03/07120, filed Jul. 30, 2003.

BACKGROUND OF THE INVENTION

The invention relates to an apparatus for the continuous tight heat-sealing of the longitudinal overlapping edges of tubular pieces generally of thermoplastic film, the thickness of which may be limited, the apparatus being particularly suitable for machines for packaging products in barrier-effect stretch film, as disclosed in patent application No. GE2001A-96 and No. BO2002A-410, the property of the present applicant, which are referred to in full.

In this type of machine, the technical problem that had to be solved was to do with the continuous tight longitudinal sealing of the overlapping edges of the packaging film as it passes over the tubularizing mandrel. It has been impossible to find, either on the market or in the known literature, an apparatus capable of solving this technical problem. It should be remembered that the film used is characterized by high grip, high extensibility and limited thickness, of the order of tens of microns, e.g. about 40 microns. The seal must be formed and interrupted rapidly, in a few hundredths of a second, on a film which begins with a standing start, advances rapidly at speeds of for example more than 0.6 metres per second, and then stops again. The seal to be formed on the longitudinal edges of the film must be extremely reliable, absolutely tight, must be elastic so as to react without defects to the stretching applied to the film, must not form hard beads that could damage packagings with which the seal comes into contact when the packagings are stacked, and must also be visually pleasing.

SUMMARY OF THE INVENTION

To solve this technical problem, a film with appropriate characteristics has been developed and is protected by a separate patent application in the name of this applicant, and since, owing to the particular layout of the machine and the particular working cycle discussed above, it was not possible to use hot-wheel sealing systems such as those used in flow-pack machines, it was decided to use a hot-air sealing system that would fulfil the special requirements of the present case. Sealing thermoplastic materials by means of a hot air flow is not new in packaging and wrapping technology. There are hot-air sealers available on the market that run at temperatures of between 120 and 600° C., supplied with compressed air at between 0.4 and 0.8 bar, which effectively form a blowpipe that directs the hot air flow to the zone where the seal is to be formed between the edges of thermoplastic material, which are usually very thick—more than a few hundred microns. These sealers usually have a metal head so that the body itself of the head can radiate heat onto the surface to be sealed, which is positioned at an appropriate distance from this body. In certain cases, the metal body of the sealer is actually heated by the heating effect of a current and its temperature is precision-controlled by electronic equipment. The hot air is usually emitted by known sealers through holes or rows of holes. However, these solutions have proved to be unsuitable for the present purposes, which is why it has been necessary to make a sealing head in a material that combines good mechanical strength, a low coefficient of friction in relation to the film and a high degree of thermal insulation, so that the head itself does not radiate heat towards the thin edges of the film to be sealed. This condition has made it possible to position the sealing head very close to the film to be sealed and to concentrate the sealing action of the jet of hot air in a defined zone, thus keeping the pressure of the hot air emitted at very low values. Made of, for example, an engineering polymer, the sealing head is light and can therefore be moved with very little inertia, rapidly and by very simple and reliable mechanisms. As the sealer is required to run with extremely short activation and deactivation times, the sealing head is mounted on a means for moving it towards and away from the film, and is connected by a flexible pipe to a fixed source supplying hot compressed air that keeps the head permanently fully operational, the head being activated and neutralized simply by moving it towards and away from the film to be sealed. When the sealing head is in the rest position, suitable screening means are used so that the hot compressed air coming out of the head does not reach the stationary film with any power.

Emitting the hot compressed air through holes has been shown to be unreliable, especially at the most sensitive moments, when the film is stopped and during the closing of the machine's pincers which grip the film, double-seal it and form the intermediate cuts. In these situations the hot air emerging from the holes formed imprints on the film that were too concentrated and could easily degenerate into burns. To avoid this problem, in the apparatus according to the invention the hot compressed air is emitted by the sealing head through at least one rectilinear slit of suitable dimensions, oriented with its greatest dimension in the direction of advance of the film. The head is preferably given two parallel slits for emitting two corresponding hot compressed air knives which are useful for forming on the film two parallel continuous sealing beads, which give a better guarantee of a tight seal. The air-emitting slits of the sealing head communicate with a chamber inside the head having a volume such as to act as an accumulating chamber, to equalize the pressure of the air leaving the various points of the said slits.

For defect-free sealing it has also been necessary to devise means for keeping the edges of the film in intimate contact and for guiding them with little friction through the film-tubularizing mandrel.

BRIEF DESCRIPTION OF THE DRAWINGS

These and other features of the invention, and the advantages procured thereby, will be made clearer by the following description of a preferred embodiment thereof, illustrated purely by way of non-restrictive example in the figures of the accompanying plates of drawings, in which:

FIG. 1 is a side view with parts in section of the principal components of the packaging machine for which the present sealer has been expressly designed;

FIG. 7 illustrates schematically a diagram of the high or low position of the sealer in relation to the progress of the film through the tubularizing mandrel of the packaging machine.

DETAILED DESCRIPTION OF THE DRAWINGS

Figure 1A:
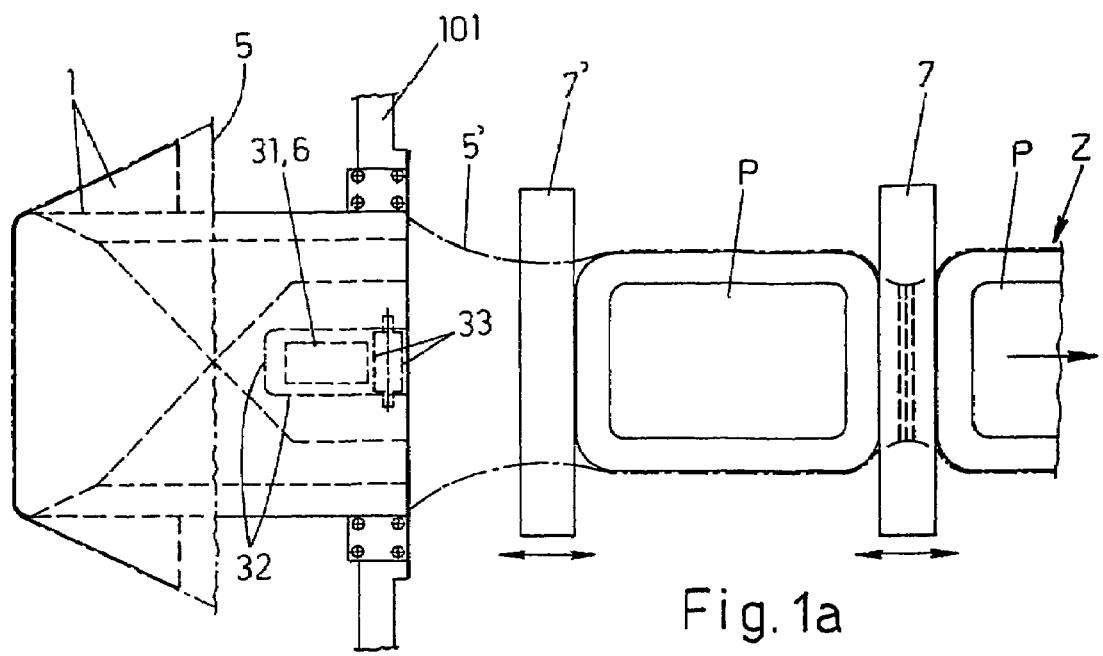
FIG. 1a is a schematic plan view of the principal working components of the packaging machine at the same stage as in FIG. 1.
Figure 5:
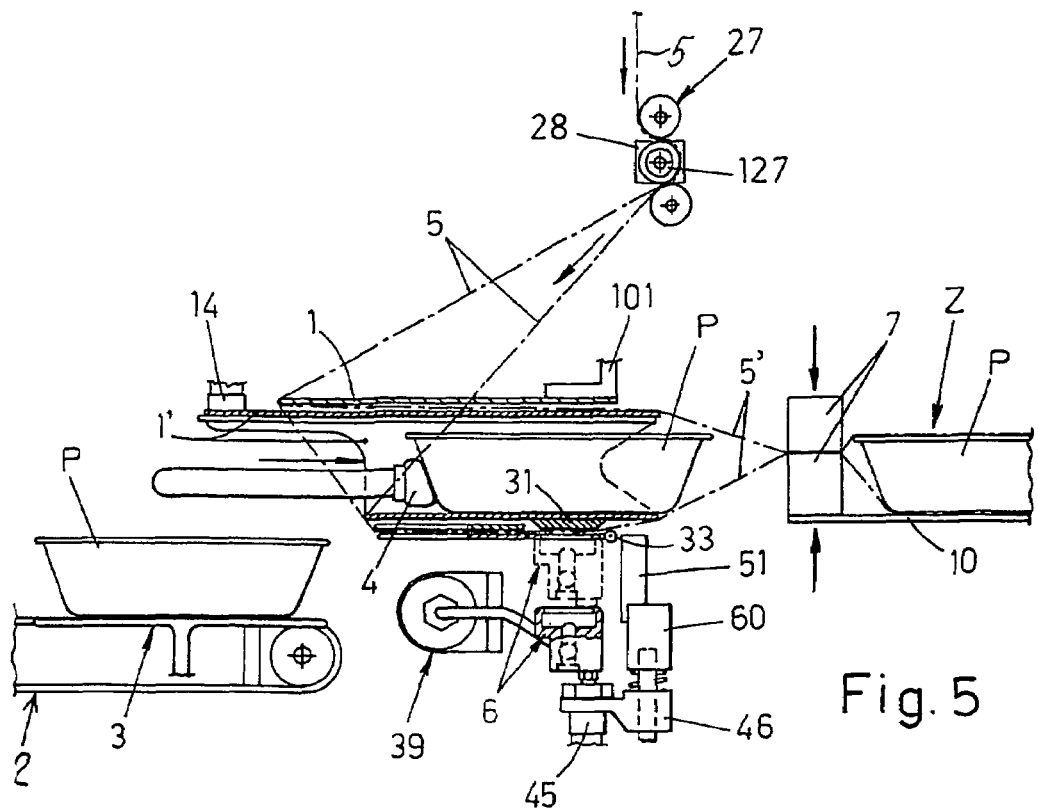
FIGS. 5 and 6 illustrate the principal components of the machine as in FIG. 1, in successive stages of their working cycle.
Figure 6:
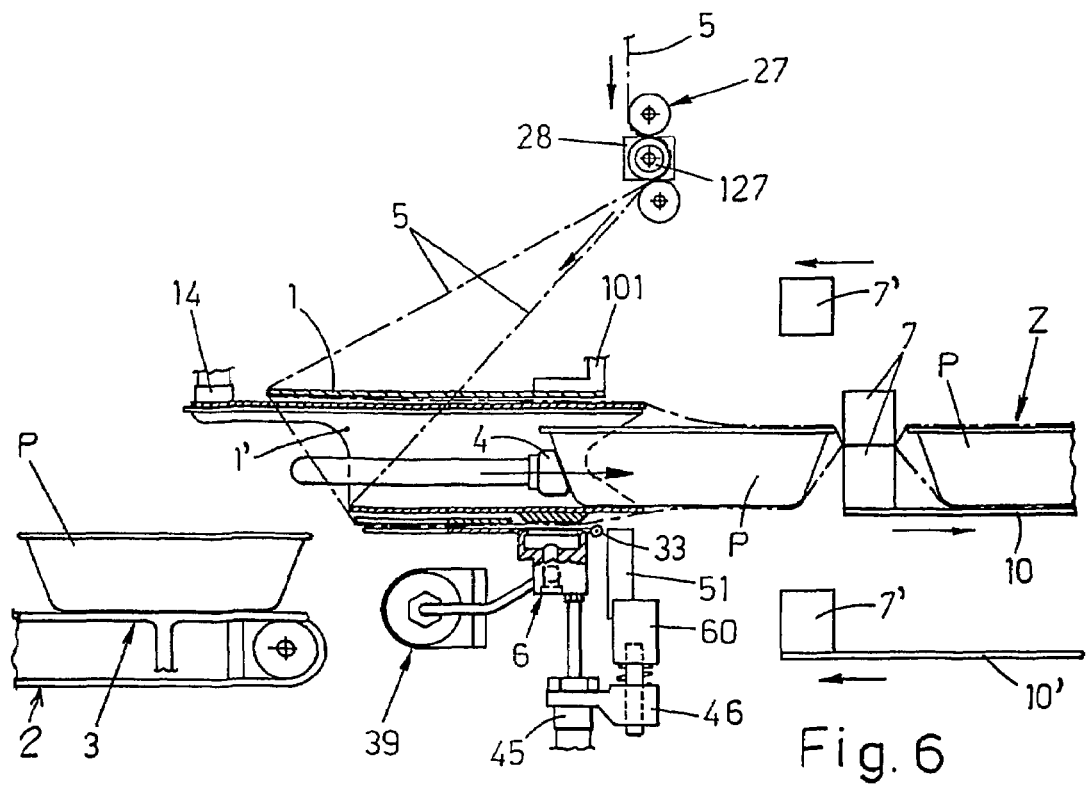

FIG. 5 shows that the machine referred to unwinds the stretch film 5 from the supply reel, assisted by rolls 27, 127; inserts this film into a horizontal mandrel 1 supported by means 101, to form a wrapping tube 5' sealed tightly along the overlapping longitudinal edges by a lower means 6; holds and closes the front end of said wrapping tube by a transverse pincer 7 which forms a double seal and an intermediate cut; and inserts the product P to be packaged through the said film-tubularizing mandrel, by means of a tubular guide 1' supported by means 14 and by means of a pusher 4, for introducing the product into the said tubular packaging, at a short distance from its closed front end which is held by the said transverse pincer 7 which advances horizontally away from the said forming mandrel. When the tubular wrapping containing the product has passed a sufficient distance out of the forming mandrel in proportion to the dimensions of the product, see FIG. 6, the film 5 is stopped and braked transversely by the activation of a brake 28 that stops the rolls 27, with the rubber-coated roll 127, while the said front pincer 7 continues to advance so as to stretch lengthwise by an appropriate amount the length of tubular wrapping, which progressively lengthens and which by reaction constricts transversely and clings tightly to the product inside it. When the product P is fully out of the assembly of the tubularizing mandrel 1 and is sufficiently distant from it (FIG. 1), the rear end of the stretched packaging is gripped transversely by a second pincer 7' which makes two transverse seals and one intermediate cut, to close the rear end of the packaging with the product and to hold it at the rear end, while the front pincer 7 opens, reverses back to the start-of-cycle position and leaves the packaged product standing on the comb 10' connected to the lower component of the pincer 7' which is active. The latter pincer holds the head end of the new tube of film coming out of the forming mandrel and the work cycle is repeated as described above. At the correct time relative to the rear closure of each packaging the brake 28 is released and the transverse clamping of the film, which had earlier allowed the completed packaging to be stretched longitudinally, is discontinued to avoid tearing of the film and to allow more tubular packaging film to be fed in, while the packaging formed in the previous cycle is carried away from the sealing and cutting pincer which is active and in the phase when this pincer is open, the said packaging is placed on a comb conveyor 11 which carries it away.

With this machine it is possible to make packagings that are not only secured tightly around the product but also completely tight, so that by using stretch film that is impermeable to gases or to certain gases, the packagings may be found useful for improving the preservation of fresh fruit and vegetable products, by limiting the migration of oxygen and encouraging the removal of carbon dioxide, or suitable for containing products in a modified atmosphere. For this latter purpose, special means are used to condition the atmosphere in the tubular packaging before its rear end is closed or to carry out the entire packaging operation in a modified-atmosphere chamber. In FIG. 1, the number 29 denotes the main machine computer, with the programming and interrogation input 129. The computer 29 receives the electrical signal from the means 30 that sense the dimensions of the product P to be packaged, in response to which the computer will control by logic means, after the lifter 3 has cyclically raised one product from the supply line 2, the stroke of the pusher 4 which inserts the raised product through the guide 1', followed by the horizontal stroke of the pincers 7, 7', then the electromagnetic brake 28, the activation and deactivation means of the longitudinal sealer 6, and other working parts of the machine which have not been discussed here as being unnecessary to an understanding of the invention, including those which optionally inject preservative gases into the cyclically formed packaging.

Figure 3:
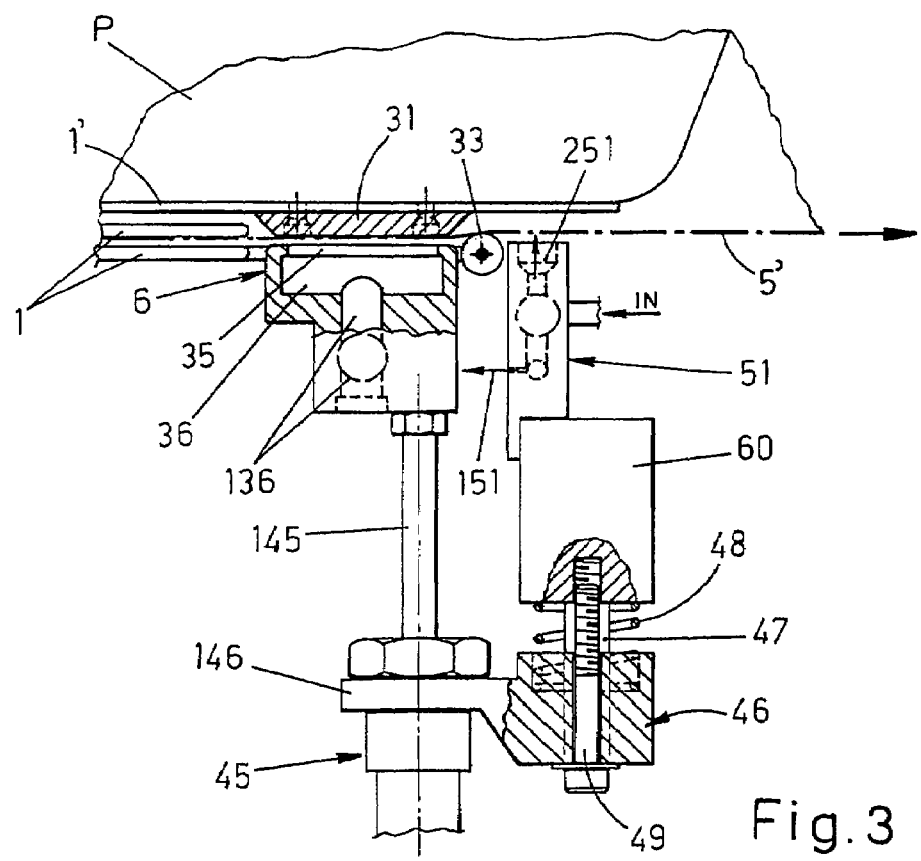
FIG. 3 is a side view with parts in section of the sealer in the high or working position.
Figures 2, 4:
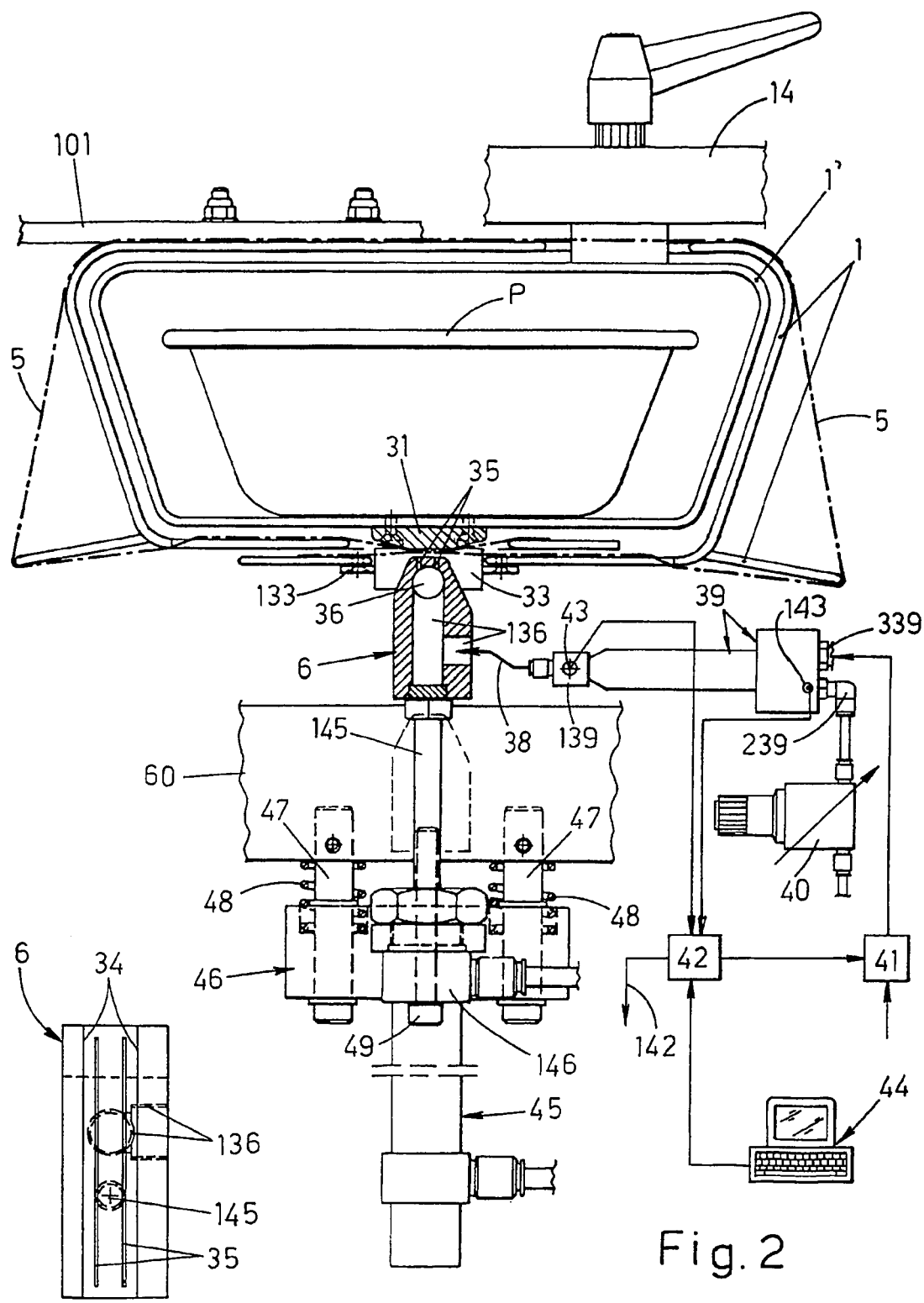
FIG. 2 is a rear end view with parts in section of the workstation of the packaging machine as in FIG. 1, showing the supply circuit of the present sealer.
FIG. 4 is a plan view of the head of the sealer.

It can be seen in FIGS. 1, 1a, 2 and 3 that in an opposing position to the sealing device 6, there is attached to the lower outer face of the bottom wall of the tubular guide 1' through which the product P is fed a flat opposing block 31 made in a suitable engineering polymer with a low coefficient of friction in relation to the film and with good properties of thermal insulation, consisting of a rectangular plate with bevelled edges which are in part fixed by screws or rivets to the said guide 1' and which is orientated so that its greatest dimension is in the direction of advance of the film. The opposing block 31 is housed with play in the central slits 32 (FIG. 1a) of the lower and mutually overlapping flanges of the forming mandrel 1 and its thickness is such that the longitudinal edges of the film controlled by these flanges overlap each other and touch each other as they slide over the component 31, as indicated in chain line in FIG. 2. In FIGS. 2 and 3 it is also clear that immediately downstream of the opposing block 31, there are attached to the lower flanges of the mandrel 1 the ends of the spindle 133 of a cylindrical roller 33, set transversely to the direction of advance of the film and made for example in the same engineering polymer as the opposing block 31, its top being set at the same level as or preferably higher than the lower face of the said opposing block 31, so that, as the outer face of the longitudinal edges of the film pass over this roller, their inside face is kept pressed against the opposing block 31.

As can also be seen with reference to FIG. 4, there is underneath and parallel to the opposing block 31, arranged centrally and in longitudinal alignment, the flat upper face 34 of the sealing head 6, formed by an essentially parallelepiped-shaped body, bevelled along the tops of its long sides and tapering at the bottom, and made in a suitable engineering polymer with good properties of mechanical strength, a low coefficient of friction in relation to the film and a high level of thermal insulation. The upper face 34 of the head 6 has one dimension approximately equal to or little different from that of the lower face by which the opposing block 31 operates in contact with the film to be sealed. Two longitudinal slits 35 are formed symmetrically in this face 34: their width may be for example about 0.3 mm and their separation about 6 mm; on the underside they lead into a horizontal cylindrical chamber 36 of appropriate volume, for example having a diameter of about 13 mm, which by means of a lower duct 136 is in communication with a flexible tube 38, made of a high-temperature-resistant material, connected to the discharge port 139 of the generator 39 which supplies hot air at a temperature of between 150 and 190° C., for example about 170° C., and at a pressure of between 0.1 and 0.8 bar, for example about 0.2-0.4 bar. It will be understood that the abovementioned values of pressure and temperature and other parameters discussed earlier relative to dimensions and/or positioning of the apparatus have to do with the use of a barrier-effect stretch-type packaging film with a thickness of about 40 microns, so it is obvious that the said values and parameters may be modified in the light of simple experiments for film of different characteristics. Via the pipe 239 and a pressure reducer 40, the generator 39 is connected to the source of compressed air, while the terminal 339 of the same generator is connected electrically to a supply interface 41 controlled by a processor 42 which senses the temperature of the hot air emitted by the generator 39, by means of a sensor 43 positioned for example in the discharge port 139 and connected to a programming and control unit 44. A sensor 143, of pressure type for example, is provided on the circuit supplying the compressed air to the generator 39 and it too is connected to the processor 42. By means of the supply and control chain 41-44, 143, it is possible to keep the operating parameters of the present sealer at constant and predetermined values. In the event of an anomaly, the terminal 142 of the processor 42 informs the computer 29 of the problem and the computer 29 moves the sealer 6 to the rest position and activates the emergency procedures.

As can be seen in FIGS. 1, 3 and 4, the head 6 is attached by its base to a linear lifting and lowering actuator of any suitable type, e.g. to the non-rotating rod 145 of a double-acting pneumatic cylinder 45 controlled by means of a solenoid valve. 50 by the main computer 29 and attached by means of its body to the side projection 146 of a small slide 46 which travels on end bushes up and down a pair of vertical rods 47, the latter in turn being mounted with downward orientation on a crossmember 60 of the machine frame at right angles to the direction of film advance. The rods 47 are enclosed in springs 48 which push the slide 46 down the said slide having, fixed rotatably to it midway between these rods, an upside-down adjusting screw 49 which is screwed to the crossmember 60. When the rod 145 of the cylinder 45 is in the high position, turning the screw 49 defines an appropriate distance between the upper face 34 of the sealing head 6 and the opposing block 31, for example a value of about 0.8-1 mm. When the rod of the cylinder 45 is lowered, the sealing head 6 is withdrawn a suitable distance from the sealed film so that the hot compressed air emerging from the slits 35 of the said head is dispersed into the environment and does not injure the film held immobile above it in the forming mandrel 1. It will be understood that suitable means can be provided to deflect away from the film the hot compressed air emerging from the sealing head 6 in the low or rest position. For this purpose screens may be provided and activated automatically when the head 6 descends, or the solution shown in FIG. 1 may be used, in which a horizontal knife of cold compressed air 151 is directed over the head 6 when in the low position: this air knife physically cuts the hot rising airflow and disperses it into the environment. The air knife 151 may be emitted by a short fixed bar 51 for example on the crossmember 60 and having an upwardly-oriented emitting nozzle 251 that supplies an appropriate flow of cold air to the sealed portion of film emerging from the present longitudinal sealing apparatus, immediately downstream of the guide roller 33, so as to stabilize the completed seal. It will however be understood that in order to limit the consumption of compressed air by the packaging machine, reduce the sources of noise and optionally also limit the wastage of heat energy, it is conceivable for the discharge port 139 of the generator 39 to be fitted with a deflecting box, controlled by the computer 29 using an appropriate interface, in order to intercept at the requisite moment and possibly recycle the hot air produced by this generator 39 during periods when the sealing head 6 is not active. This solution has not been illustrated, but it should be understood to be protected in as much as it may easily be carried out by those skilled in the art on the basis of the account given herein.

The sealing apparatus as described operates in the following manner.

In FIG. 5 it can be seen that when the pincer 7 is closed on the head of the tubularized film 5' emerging from the forming mandrel 1 and when this pincer prepares to move away from the mandrel, the sealing head 6 is in the raised position so as to form on the longitudinal edges of the film sliding across the mandrel 1, two parallel continuous tight sealing beads. In the diagram shown in FIG. 7, the curves marked 52f(5) and 53f(6) relate respectively to the advancing of the film 5 and to the high or low position of the sealing head and the beginning 152 and 153 of each of these curves shows the phase of FIG. 6. In the phase of FIG. 1, when the film is clamped by the rolls 27, 127 and by the brake 28, and its advance is arrested as indicated at 252 in FIG. 7, at the correct time the sealing head 6 is lowered as indicated at 253 in the same FIG. 7. In the phase of FIG. 1, the tubular packaging 5' with the product inside is stretched longitudinally and the tail end of the longitudinal seal of the film does not move significantly relative to the opposing block 31, because the film stretches mostly in the section downstream of the forming mandrel, owing in part to a suitable thermal treatment applied to the film by means which are not discussed here, being unnecessary to an understanding of the invention. Following stretching, at the right time relative to the closing of the pincer 7' the brake 28 comes off to allow enough film to advance through the forming mandrel to prevent the film being torn by the pincer 7'. During this phase the film advances by a small amount as indicated at 352 and the sealing head 6 is rapidly raised and lowered as indicated at 353 in the same graph, FIG. 7, and as illustrated in broken lines and solid lines in FIG. 5, thus ensuring continuity of the longitudinal seal of the overlapping edges of the film. Subsequently, when the pincer 7' begins to move away from the forming mandrel, the cycle is repeated with the longitudinal advance of the film as marked at 152' and with the raising of the sealing head 6 at the appropriate time, as indicated at 153' in the graph, FIG. 7.

It will be understood that the description has referred to a preferred embodiment of the invention, to which it is possible to make many variations and modifications of construction, which may derive from the use of the longitudinal sealing apparatus in packaging machines other than that illustrated or in machines for forming bags, carrier bags etc., such as the type disclosed in Italian patent application No. BO2001A-91 belonging to this applicant. The pneumatic cylinder 45 can be replaced with some other linear actuator, such as a screw-and-nut or equivalent actuator powered by a motor with electronic control of speed and phase, so that the head 6 can be moved with gradients of acceleration and deceleration and with speeds and phases controllable with greater ease by the main computer 29.

The invention claimed is:

1. An apparatus for continuous tight heat-sealing of the longitudinal overlapping edges of tubular pieces of thermoplastic film, the thickness of which may be limited, produced by unwinding the film from a reel and advancing the film longitudinally through a tubularizing mandrel, said apparatus comprising:

guide means for guiding and for holding the longitudinal edges of the tubularized film so that the longitudinal edges overlap with an intimate and sufficiently distributed contact;

a sealing head, disposed in an opposing position relative to, and a short distance from, the guide means, the sealing head made of a material with good mechanical strength and with a low coefficient of friction in relation to the film to be sealed and with a high degree of thermal insulation, the sealing head adapted to direct at least one continuous jet of air or other gas onto the edges of the film to be sealed, wherein the jet of air or other gas being heated to an appropriate temperature and at an appropriate pressure; and a fixed generator of hot compressed air controlled by a suitable supply and control means, the generator connected to the sealing head via a flexible or jointed means, the sealing head being mounted on means of approach and withdrawal, such that, when the film advances, the sealing head is placed a short distance from the film, in an operation position to seal the film, whereas when the film stops, the sealing head is withdrawn from the film, wherein the sealing head, viewed end-on in the direction of advance of the film to be sealed, is of an essentially rectangular shape, the sealing head has beveled upper long sides, and an upper face of the sealing head has a footprint essentially the same as an effective footprint of the guide means over which the edges of the film to be sealed slide.

2. The apparatus according to claim 1, wherein the guide means comprises a flat fixed opposing block of suitable thickness, over which the edges of the film slide, the opposing block being appropriately rounded at its edges and being made in a suitable engineering polymer.

3. The apparatus according to claim 2, further comprises immediately downstream of the opposing block, a second guide means that acts on the opposite face of the overlapping edges of the film from that on which the opposing block acts, thereby providing constant contact between the film and the opposing block, and the second guide means is composed of a suitable engineering polymer.

4. The apparatus according to claim 3, wherein the second guide means comprises a roller positioned with its axis of rotation being perpendicular to the direction of advance of the film.

5. The apparatus according to claim 1, wherein the sealing head is made in a suitable engineering polymer.

6. The apparatus according to claim 1, further comprises at least one rectangular slit which forms an opening on the upper face of the sealing head, the slit having dimensions correlated to the thickness and characteristics of the film to be sealed, the slit being oriented so that its greatest dimension is in the direction of advance of the film, and the slit communicating with a buffer chamber of suitable volume formed inside the sealing head and connected by branched ducts to the flexible or jointed means.

7. The apparatus according to claim 6, wherein the at least one rectangular slit comprises two rectangular slits open on the upper face of the sealing head, the two rectangular slits symmetrically arranged to produce on the overlapping edges of the film two continuous longitudinal seals to ensure tightness.

8. The apparatus according to claim 6, wherein, in order to seal barrier-effect stretch films with a thickness of about 40 microns, the rectangular slits in the sealing head have a width of about 0.3 mm.

9. The apparatus according to claim 8, wherein the rectangular slits in the sealing head are separated by a distance of about 6 mm.

10. The apparatus according to claim 6, wherein in order to seal barrier-effect stretch films with a thickness of about 40 microns, the generator of hot compressed air is adapted to generate hot air which passes out through the rectangular slit in the sealing head at a temperature of between 160° C. and 180° C., and at a pressure of between 0.1 and 0.8 bar.

11. An apparatus for continuous tight heat-sealing of the longitudinal overlapping edges of tubular pieces of thermoplastic film, the thickness of which may be limited, produced by unwinding the film from a reel and advancing the film longitudinally through a tubularizing mandrel, said apparatus comprising:

guide means for guiding and for holding the longitudinal edges of the tubularized film so that the longitudinal edges overlap with an intimate and sufficiently distributed contact;

a sealing head, disposed in an opposing position relative to, and a short distance from, the guide means, the sealing head made of a material with good mechanical strength and with a low coefficient of friction in relation to the film to be sealed and with a high degree of thermal insulation, the sealing head adapted to direct at least one continuous jet of air or other gas onto the edges of the film to be sealed, wherein the jet of air or other gas being heated to an appropriate temperature and at an appropriate pressure; and a fixed generator of hot compressed air controlled by a suitable supply and control means, the generator connected to the sealing head via a flexible or jointed means, the sealing head being mounted on means of approach and withdrawal, such that, when the film advances, the sealing head is placed a short distance from the film, in an operation position to seal the film, whereas when the film stops, the sealing head is withdrawn from the film, an air inlet with a pressure reducer, through which a source supplying compressed air is connected to the generator of hot compressed air; and an electrical terminal connecting the generator of hot compressed air to an electrical supply interface controlled by a processor which, by means of a heat sensor and a pressure sensor, are adapted to sense operating temperature and pressure, respectively, of the generator, which is connected to a programming and control unit which comprises the control means, the processor having an output terminal, which in the event of an anomaly, sends a signal to a general computer of the packaging machine that the sealing head needs be rested and emergency measures activated.

12. The apparatus according to claim 11, wherein the heat sensor and the pressure sensor of the hot compressed air generator are located at a discharge port and at an inlet port, respectively, of the generator.

13. The apparatus according to claim 11, wherein, in normal operating situations, the sealing head works continuously at normal output and, when lowered to move it away from the film because the film is stationary, screening means are activated, to deflect the flow of hot compressed air emerging from the head.

14. The apparatus according to claim 13, wherein the screening means comprises a horizontal cold or room-temperature compressed-air knife emitted by a short fixed bar, the sealing head moving to a lower level than this bar when in the low or rest position.

15. The apparatus according to claim 14, wherein the short fixed bar has a nozzle that emits a jet of cooling air onto the continuous seals produced by the sealing head when in an active position.

16. The apparatus according to claim 11, further comprises a deflector device located at a discharge port of the hot compressed air generator, the deflector device, convertible, in phase with an up or down movement of the sealing head, to switch its state so as to supply hot compressed air to the sealing head or deflect the hot compressed air in other directions, respectively, whereby when the sealing head is raised, the sealing head is fully operational.

17. An apparatus for continuous tight heat-sealing of the longitudinal overlapping edges of tubular pieces of thermoplastic film, the thickness of which may be limited, produced by unwinding the film from a reel and advancing the film longitudinally through a tubularizing mandrel, said apparatus comprising:
  guide means for guiding and for holding the longitudinal edges of the tubularized film so that the longitudinal edges overlap with an intimate and sufficiently distributed contact;
  a sealing head, disposed in an opposing position relative to, and a short distance from, the guide means, the sealing head made of a material with good mechanical strength and with a low coefficient of friction in relation to the film to be sealed and with a high degree of thermal insulation, the sealing head adapted to direct at least one continuous jet of air or other gas onto the edges of the film to be sealed, wherein the jet of air or other gas being heated to an appropriate temperature and at an appropriate pressure; and
  a fixed generator of hot compressed air controlled by a suitable supply and control means, the generator connected to the sealing head via a flexible or jointed means, the sealing head being mounted on means of approach and withdrawal, such that, when the film advances, the sealing head is placed a short distance from the film, in an operation position to seal the film, whereas when the film stops, the sealing head is withdrawn from the film,
  wherein the sealing head is attached to a moving part of a rectilinear actuator mounted on a slide that moves on guide means parallel to the movement of the actuator, the slide being pushed in one direction by elastic means and being movable in the opposite direction by means of an adjusting screw, all in such a way that it is possible to adjust the distance of the sealing head from the film to be sealed when in an active sealing position.

18. The apparatus according to claim 17, wherein the actuator is a double-acting fluid-pressure cylinder with a non-rotating rod.

19. The apparatus according to claim 17, wherein the rectilinear actuator is of a type controlled by a motor with electronic control of speed and phase, so that the sealing head can be moved towards and away from the film with appropriate decelerations and accelerations correlated to the starting and stopping of the film.

20. An apparatus for continuous tight heat-sealing of the longitudinal overlapping edges of tubular pieces of thermoplastic film, the thickness of which may be limited, produced by unwinding the film from a reel and advancing the film longitudinally through a tubularizing mandrel, said apparatus comprising:
  guide means for guiding and for holding the longitudinal edges of the tubularized film so that the longitudinal edges overlap with an intimate and sufficiently distributed contact, the guide means comprising an opposing block fixed to an outer face of a bottom wall of the fixed tubular guide, the opposing block having a surface on which the longitudinal edges of the thermoplastic film to be sealed are pressed and guided, and the guiding means further comprises a guide roller mounted by a spindle to lower flanges of the horizontal film-tubularizing mandrel, the tubularizing mandrel having a large slot through which the opposing block passes and through which overlapping edges of the film are visible and can be prepared by the sealing head;
  a sealing head, disposed in an opposing position relative to, and a short distance from, the guide means, the sealing head made of a material with good mechanical strength and with a low coefficient of friction in relation to the film to be sealed and with a high degree of thermal insulation, the sealing head adapted to direct at least one continuous jet of air or other gas onto the edges of the film to be sealed, wherein the jet of air or other gas being heated to an appropriate temperature and at an appropriate pressure;
  a fixed generator of hot compressed air controlled by a suitable supply and control means, the generator connected to the sealing head via a flexible or jointed means, the sealing head being mounted on means of approach and withdrawal, such that, when the film advances, the sealing head is placed a short distance from the film, in an operation position to seal the film, whereas when the film stops, the sealing head is withdrawn from the film, the means of approach and withdrawal comprising a lifting and lowering actuator controlled by a main computer in such a way that the sealing head is:
    (a) up while the film is advancing,
    (b) down when the film is stopped, and
    (c) temporarily raised during a phase of longitudinal stretching of each packaging, before the back of the packaging is closed;
  a horizontal film-tubularizing mandrel, for longitudinal edges of thermoplastic film to be overlapped underneath the horizontal film-tubularizing mandrel to be sealed tightly by the sealing head;
  a fixed tubular guide passing longitudinally through the horizontal film-tubularizing mandrel in order to insert product to be packaged in the thermoplastic film;
  means for the controlled supply of the thermoplastic film disposed upstream of the horizontal film-tubularizing mandrel; and
  gripping pincers, disposed downstream of the horizontal film-tubularizing mandrel, for double sealing and intermediate cutting, the gripping pincers alternate upstream and downstream of tubular packaging with product inside, to form a packaging with a prior longitudinal stretching operating.

* * * * *